United States Patent
Kim et al.

(10) Patent No.: US 10,200,099 B2
(45) Date of Patent: Feb. 5, 2019

(54) METHOD FOR DESIGNING HIERARCHICAL STRUCTURE PRECODER IN VEHICLE-TO-VEHICLE COMMUNICATION SYSTEM, AND DEVICE THEREFOR

(71) Applicant: LG ELECTRONICS INC., Seoul (KR)

(72) Inventors: Heejin Kim, Seoul (KR); Jiwon Kang, Seoul (KR); Kitae Kim, Seoul (KR); Kilbom Lee, Seoul (KR); Kyungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/737,078

(22) PCT Filed: Jan. 14, 2016

(86) PCT No.: PCT/KR2016/000401
§ 371 (c)(1),
(2) Date: Dec. 15, 2017

(87) PCT Pub. No.: WO2016/204365
PCT Pub. Date: Dec. 22, 2016

(65) Prior Publication Data
US 2018/0183505 A1 Jun. 28, 2018

Related U.S. Application Data

(60) Provisional application No. 62/181,774, filed on Jun. 19, 2015.

(51) Int. Cl.
*H04B 7/02* (2018.01)
*H04B 7/06* (2006.01)
(Continued)

(52) U.S. Cl.
CPC ......... *H04B 7/0617* (2013.01); *H04B 7/0452* (2013.01); *H04B 7/0634* (2013.01);
(Continued)

(58) Field of Classification Search
CPC .. H04B 7/0617; H04B 7/0452; H04B 7/0634; H04B 7/0695; H04B 7/0408;
(Continued)

(56) References Cited

U.S. PATENT DOCUMENTS

2011/0007685 A1   1/2011   Ma et al.

FOREIGN PATENT DOCUMENTS

| JP | 2014-524712 A | 9/2014 |
| KR | 10-2013-0034827 A | 4/2013 |

(Continued)

*Primary Examiner* — Zewdu Kassa
(74) *Attorney, Agent, or Firm* — Birch, Stewart, Kolasch & Birch, LLP

(57) ABSTRACT

The present specification relates to a method by which a terminal designs a hierarchical structure precoder in a vehicle-to-vehicle communication system. The method for designing a hierarchical structure precoder can comprise the steps of: receiving group information indicating a terminal group on the basis of a direction of a first-type beam; feeding back preference information on the first-type beam on the basis of the group information; receiving first-type beam information determined on the basis of the preference information; designing a hierarchical structure precoder including a first precoder and a second precoder, on the basis of the received first-type beam information; and feeding back channel information on the basis of the hierarchical structure precoder, wherein the first precoder can be precoder information on the first-type beam direction, and the second precoder can be precoder information on a second-type beam direction in the first-type beam direction.

15 Claims, 16 Drawing Sheets

(51) Int. Cl.
*H04W 4/46* (2018.01)
*H04B 7/0452* (2017.01)
*H04B 7/0408* (2017.01)
*H04L 5/00* (2006.01)

(52) U.S. Cl.
CPC ............ *H04B 7/0695* (2013.01); *H04W 4/46* (2018.02); *H04B 7/0408* (2013.01); *H04B 7/0626* (2013.01); *H04B 7/0639* (2013.01); *H04L 5/0048* (2013.01)

(58) Field of Classification Search
CPC ..... H04B 7/0626; H04B 7/0639; H04W 4/46; H04L 5/0048
USPC ................ 375/267, 260, 259, 316, 219, 295
See application file for complete search history.

(56) References Cited

FOREIGN PATENT DOCUMENTS

WO    WO 2013/125917 A1    8/2013
WO    WO 2015/065157 A1    5/2015

FIG. 2
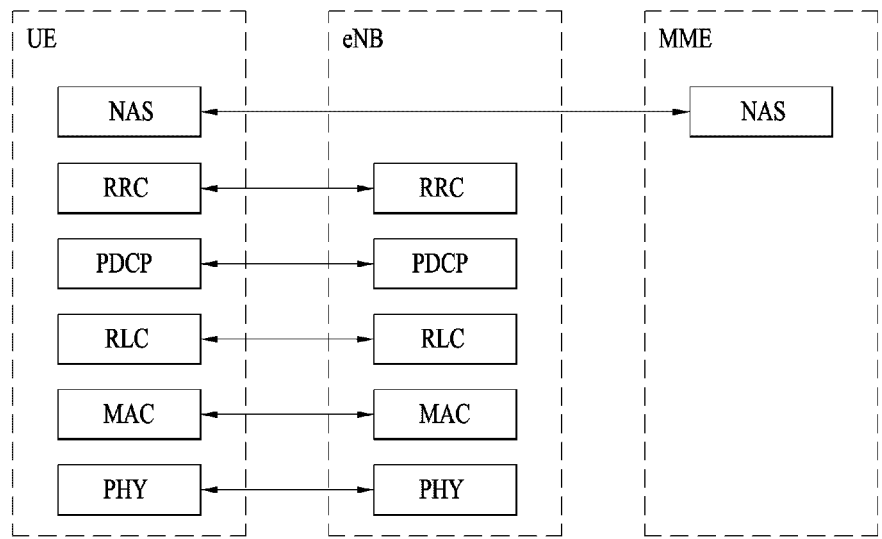
(A) CONTROL-PLANE PROTOCOL STACK
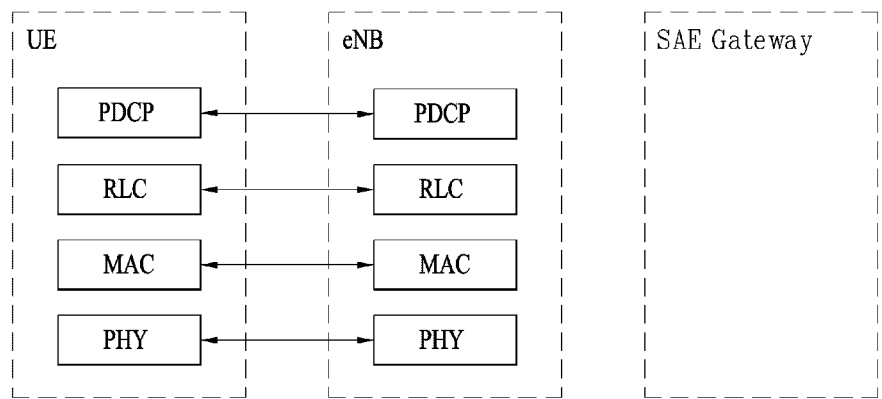
(B) USER-PLANE PROTOCOL STACK (a)   (b)

FIG. 10
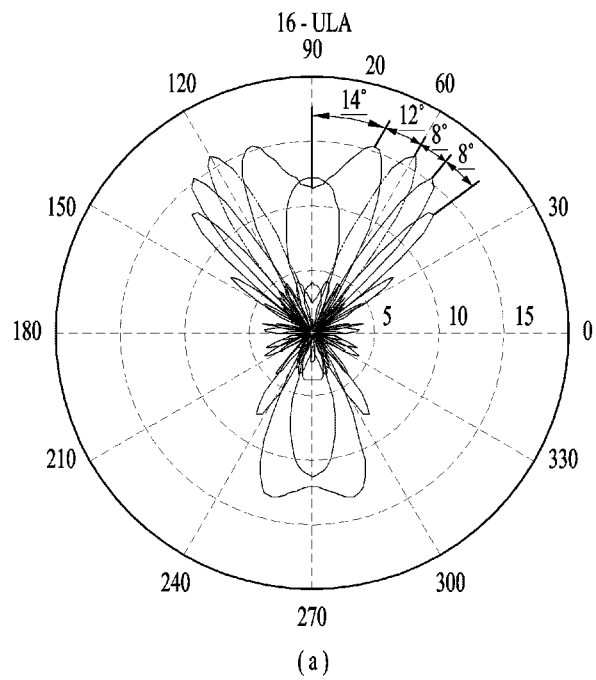
(a)
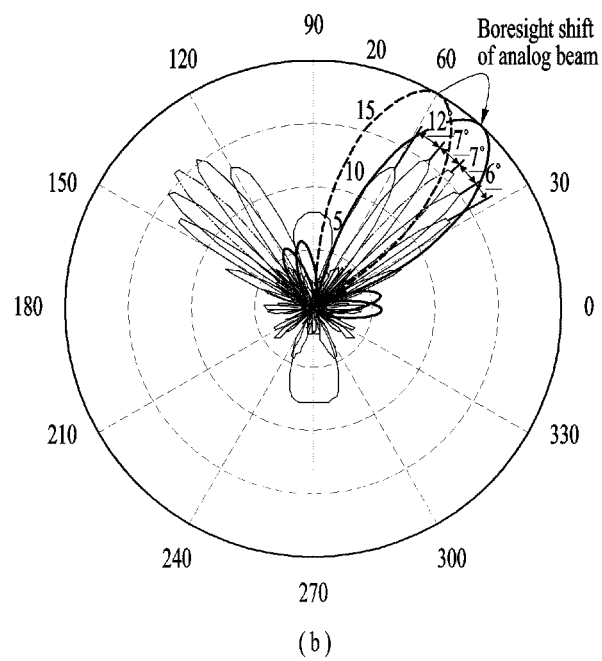
(b)

FIG. 11
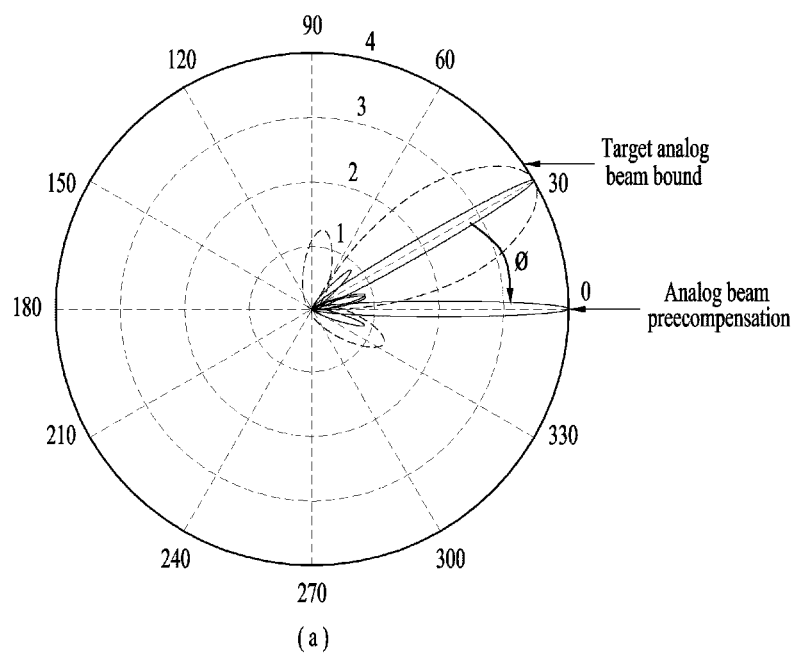
(a)
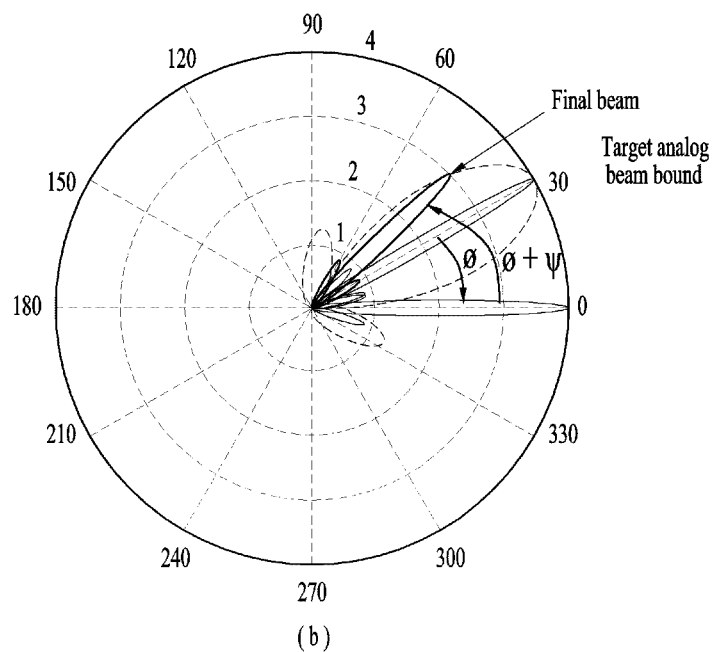
(b)

METHOD FOR DESIGNING HIERARCHICAL STRUCTURE PRECODER IN VEHICLE-TO-VEHICLE COMMUNICATION SYSTEM, AND DEVICE THEREFOR

CROSS REFERENCE TO RELATED APPLICATIONS

This application is the National Phase of PCT International Application No. PCT/KR2016/000401, filed on Jan. 14, 2016, which claims priority under 35 U.S.C. 119(e) to U.S. Provisional Application No. 62/181,774, filed on Jun. 19, 2015, all of which are hereby expressly incorporated by reference into the present application.

TECHNICAL FIELD

The present specification relates to a wireless communication system, and more particularly, to a wireless communication system applied to vehicle-to-vehicle communication. In this case, the present specification provides a method of designing a precoder applied to a vehicle-to-vehicle system.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

In addition, recently, interest in a vehicular communication system has increased. More specifically, interest in a method of applying wireless communication technology and position tracking technology (global positioning system (GPS)) to a vehicle and providing a service such as vehicle diagnosis, theft detection, route guidance or traffic service provision to a driver who uses the vehicle in real time has increased. At this time, there is a need for methods of efficiently performing vehicular communication in consideration of the appearance and mobility of a vehicle and interference with another vehicle in a vehicular communication system.

DISCLOSURE

Technical Problem

An object of the present specification devised to solve the problem lies in a method and apparatus for designing a hierarchical structure precoder in a vehicle-to-vehicle communication system.

Another object of the present invention is to provide an efficient channel information feedback method for vehicular communication in consideration of an environment in which vehicles are densely distributed.

An object of the present specification devised to solve the problem lies in a method of designing a precoder in consideration of a beam direction and beam resolution provided to a vehicle.

Technical Solution

The object of the present invention can be achieved by providing A method of designing a hierarchical structure precoder by a user equipment (UE), the method comprising: receiving group information indicating a UE group based on a direction of a first type beam; feeding back preference information on the first type beam based on the group information; receiving information on the first type beam, determined based on the preference information; designing the hierarchical structure precoder comprising a first precoder and a second precoder based on the received first type beam information; and feeding back channel information based on the hierarchical structure precoder, wherein the first precoder is precoder information on the first type beam direction and the second precoder is precoder information on a direction of a second type beam in the direction of the first type beam.

In another aspect of the present invention, a user equipment (UE) for designing a hierarchical structure precoder, comprising: a reception module configured to receive information from an external device; a transmission module configured to transmit information to an external device; and a processor configured to control the reception module and the transmission module, wherein the processor receives group information indicating a UE group based on a direction of a first type beam using the reception module, feeds back preference information on the first type beam based on the group information using the transmission module, receives information on the first type beam, determined based on the preference information, using the reception module, designs the hierarchical structure precoder comprising a first precoder and a second precoder based on the received first type beam information, and feeds back channel information based on the hierarchical structure precoder using the transmission module; and wherein the first precoder is precoder information on the first type beam direction and the second precoder is precoder information on a direction of a second type beam in the direction of the first type beam.

In addition, the method of designing a hierarchical precoder and the following features for a UE can be applied in common.

In another aspect of the present invention, the first type beam is a broad beam and the second type beam is a fine beam.

In another aspect of the present invention, the first precoder is information included in the received information on the first type beam.

In another aspect of the present invention, wherein the second precoder is precoder information designed based on the first precoder.

In another aspect of the present invention, wherein the second precoder is precoder information designed based on beam resolution of the second type beam.

In another aspect of the present invention, the designed hierarchical structure precoder is a precoder designed based on any one of analog beamforming, digital beamforming, and hybrid beamforming.

In another aspect of the present invention, when the designed hierarchical structure precoder is a precoder designed based on the hybrid beamforming, the first type beam is determined based on the analog beamforming and the second beam is determined based on the digital beamforming.

In another aspect of the present invention, the first precoder is a precoder designed based on a first compensation value of the analog beamforming and the second precoder is a precoder designed based on a second compensation value of the digital beamforming.

In another aspect of the present invention, the first precoder is a precoder for changing a boresight of the analog beamforming to zero degrees; and wherein the second precoder is a precoder for determining a direction of the hybrid beamforming based on the boresight of the analog beamforming, changed to zero degrees.

In another aspect of the present invention, the first type beam information is determined further using at least one of channel reciprocity based on a transmission signal of the UE or positional information of the UE.

In another aspect of the present invention, wherein the preference information is fed back only when the UE is a representative UE in the UE group indicated by the group information.

In another aspect of the present invention, wherein the information on the first type beam is received only when the UE is the representative UE in the UE group.

In another aspect of the present invention, further comprising transmitting the information of the first UE to another UE in the UE group.

In another aspect of the present invention, the preference information fed back by the UE comprises a plurality of preference information items on the plurality of first type beams.

Advantageous Effects

The present specification may provide a method and apparatus for designing a hierarchical structure precoder in a vehicle-to-vehicle communication system.

The present specification may provide a method of designing a precoder in consideration of a beam direction and beam resolution provided to a vehicle.

The effects which can be obtained by the present invention are not limited to the above-described effects and other effects which are not described herein will become apparent to those skilled in the art from the following description.

DESCRIPTION OF DRAWINGS

FIG. 2 is a diagram illustrating structures of a control plane and a user plane of a radio interface protocol between a UE and an E-UTRAN based on the 3GPP radio access network specification according to an embodiment of the present invention.

FIG. 10 is a diagram showing a beam direction and beam resolution according to an embodiment of the present specification.

FIG. 11 is a diagram showing a beam direction and beam resolution based on beamforming according to an embodiment of the present specification.

BEST MODEL

Figure 1:
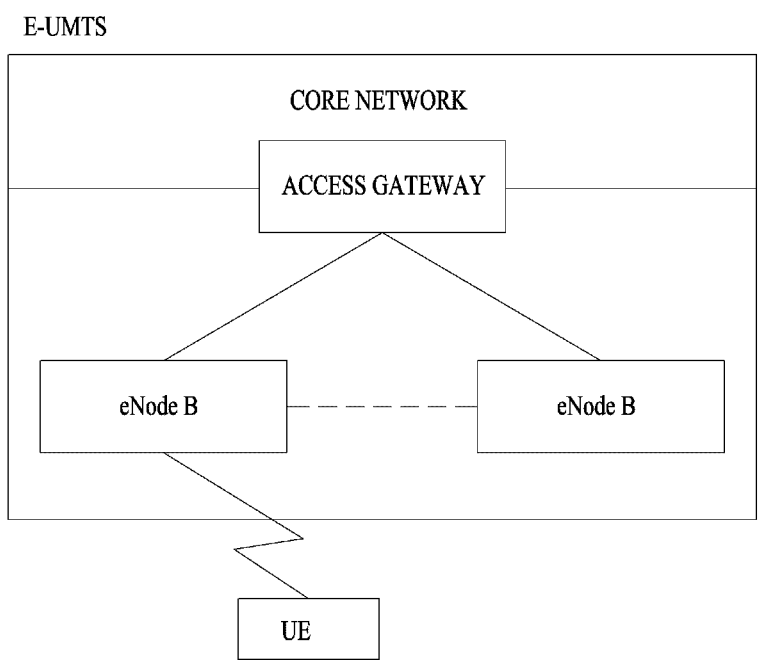
FIG. 1 is a diagram schematically illustrating a network structure of an E-UMTS as an exemplary radio communication system according to an embodiment of the present invention.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The embodiments of the present invention can be supported by the standard documents disclosed in any one of wireless access systems, such as an IEEE 802 system, a 3rd Generation Partnership Project (3GPP) system, 3GPP Long Term Evolution (LTE) and LTE-Advanced (LTE-A) systems, and a 3GPP2 system. That is, the steps or portions, which are not described in order to make the technical spirit of the present invention clear, may be supported by the above documents. In addition, all the terms disclosed in the present document may be described by the above standard documents.

The following technology can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied with wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA).

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the entire specification, when a certain portion "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof.

FIG. 2 is a diagram illustrating structures of a control plane and a user plane of a radio interface protocol between a UE and an E-UTRAN based on the 3GPP radio access network specification according to an embodiment of the present invention.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
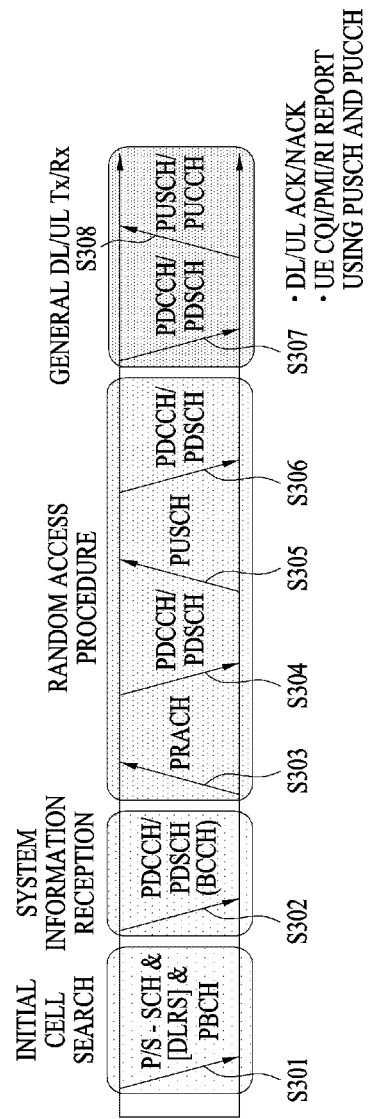
FIG. 3 is a diagram illustrating physical channels used in a 3GPP system and a general signal transmission method using the same according to an embodiment of the present invention.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
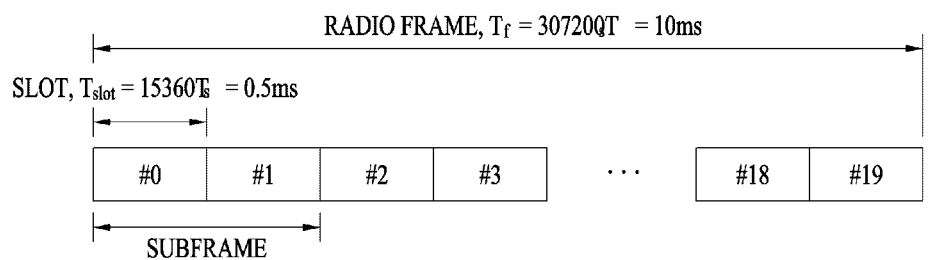
FIG. 4 is a diagram illustrating the structure of a radio frame used in an LTE system according to an embodiment of the present invention.

FIG. 4 illustrates a structure of a radio frame used in the LTE system.

Referring to FIG. 4, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and Ts=1/(15 kHz×2048)=3.2552×10-8 (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
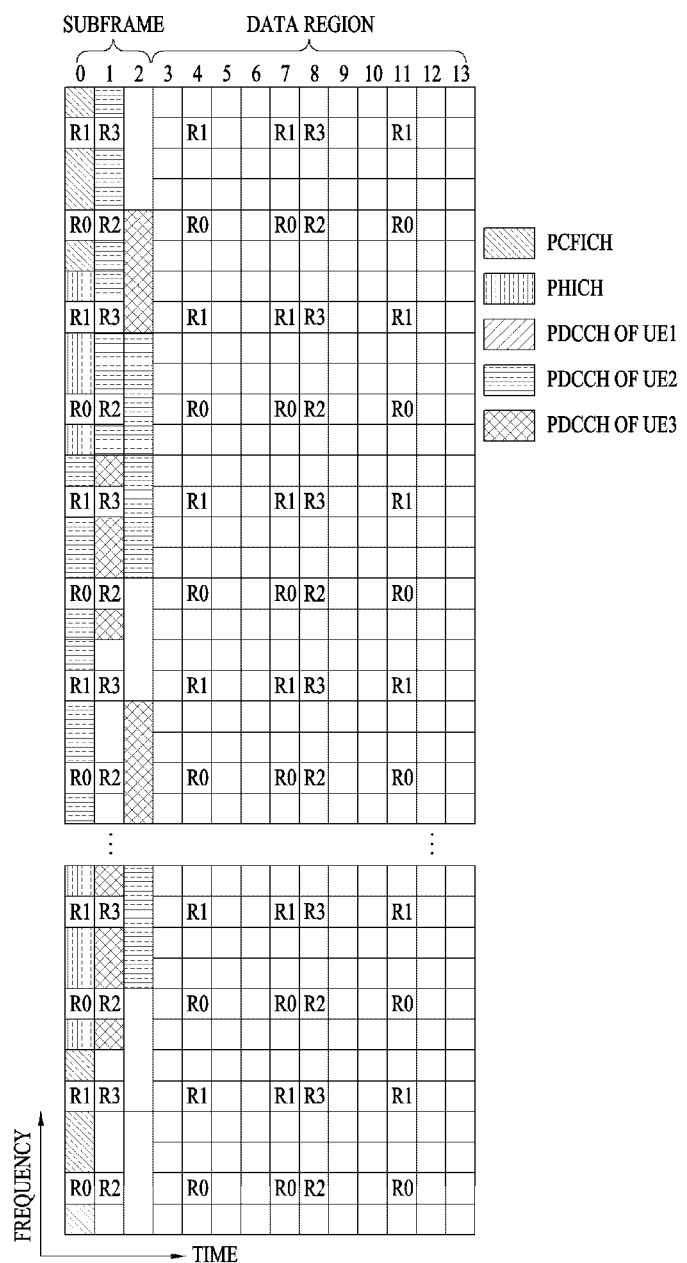
FIG. 5 is a diagram showing the structure of a downlink radio frame used in an LTE system according to an embodiment of the present invention.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
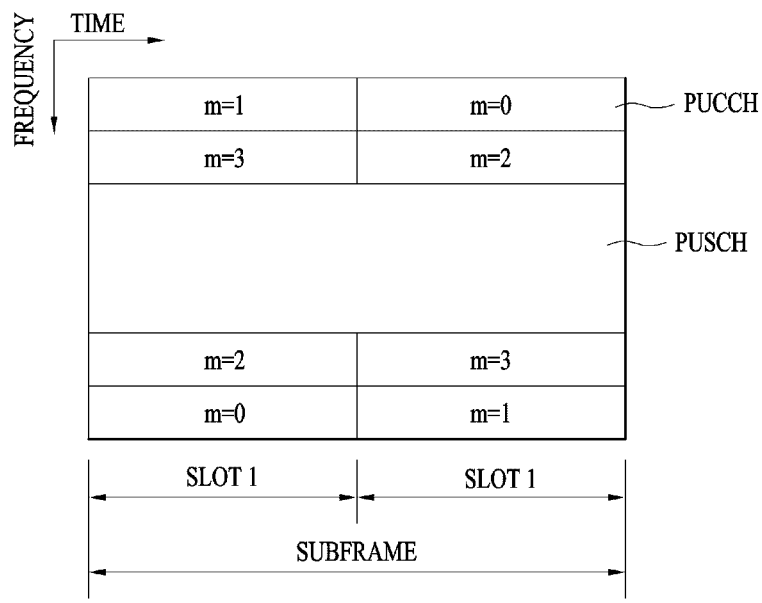
FIG. 6 is a diagram showing the structure of an uplink radio frame used in an LTE system according to an embodiment of the present invention.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Figure 7:
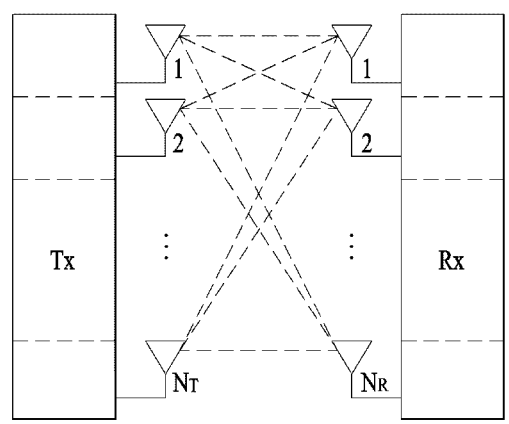
FIG. 7 is a diagram showing the structure of a general multiple input multiple output (MIMO) communication system according to an embodiment of the present invention.

FIG. 7 is a diagram showing the structure of a general multiple input multiple output (MIMO) communication system according to an embodiment of the present invention.

MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

FIG. 7 illustrates the configuration of a typical MIMO communication system. A transmitter has NT transmit (Tx) antennas and a receiver has NR receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate Ro that may be achieved with a single antenna, the transmission rate may be increased, in theory, to the product of Ro and a transmission rate increase rate Ri in the case of multiple antennas, as indicated by Equation 1. Ri is the smaller of NT and NR.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that NT Tx antennas and NR Rx antennas are present as illustrated in FIG. 7. Regarding a transmission signal, up to NT pieces of information can be transmitted through the NT Tx antennas, as expressed as the vector of Equation 2 below.

$$s = [s_1, s_2, \ldots, s_{N_T}]^T \quad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as shown in Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector ŝ may be expressed as shown in Equation 4 below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps. \quad \text{[Equation 4]}$$

Meanwhile, NT transmission signals $x_1, x_2, \ldots, x_{N_T}$ to be actually transmitted may be configured by multiplying the transmission power-controlled information vector ŝ by a weight matrix W. The weight matrix functions to appropriately distribute the transmission information to individual antennas according to transmission channel states, etc. The transmission signals $x_1, x_2, \ldots, x_{N_T}$ are represented as a vector X, as shown in Equation 5 below. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as shown in Equation 6 below.

$$\text{rank}(H) \leq (N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is expressed as shown in Equation 7 below.

$$\text{\# of streams} \leq \text{ran}(H) \leq \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

It is expected that the future-generation mobile communication standard, LTE-A will support Coordinated Multi-Point (CoMP) transmission in order to increase data rate, compared to the legacy LTE standard. CoMP refers to transmission of data to a UE through cooperation from two or more eNBs or cells in order to increase communication performance between a UE located in a shadowing area and an eNB (a cell or sector).

CoMP transmission schemes may be classified into CoMP-Joint Processing (CoMP-JP) called cooperative MIMO characterized by data sharing, and CoMP-Coordinated Scheduling/Beamforming (CoMP-CS/CB).

In DL CoMP-JP, a UE may instantaneously receive data simultaneously from eNBs that perform CoMP transmission and may combine the received signals, thereby increasing reception performance (Joint Transmission (JT)). In addition, one of the eNBs participating in the CoMP transmission may transmit data to the UE at a specific time point (Dynamic Point Selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (Joint Reception (JR)). In contrast, in UL CoMP-CS/CB, only one eNB receives a PUSCH from a UE. Herein, cooperative cells (or eNBs) may make a decision as to whether to use CoMP-CS/CB.

Hereinbelow, a description of channel state information (CSI) reporting will be given. In the current LTE standard, a MIMO transmission scheme is categorized into open-loop MIMO operated without CSI and closed-loop MIMO operated based on CSI.

Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1W2) \quad \text{[Equation 8]}$$

In Equation 1, W2 is a short-term PMI, which is a codeword of a codebook reflecting short-term channel information, W is a codeword of a final codebook, and norm (A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix}, \text{ where } X_i \text{ is } Nt/2 \text{ by } M \text{ matrix.} \quad \text{[Equation 9]}$$

-continued $$W2(j) = \overbrace{\begin{bmatrix} e_M^k & e_M^l & & e_M^m \\ \alpha_j e_M^k & \beta_j e_M^l & \cdots & \gamma_j e_M^m \end{bmatrix}}^{r \text{ columns}} \text{ (if rank} = r),$$

where $1 \le k, l, m \le M$ and $k, l, m$ are integer.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

In Equation 9, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown in Equation 10 below.

$$W1(i) * W2(j) = \begin{bmatrix} X_i(k) \\ \alpha_j X_i(k) \end{bmatrix} \quad \text{[Equation 10]}$$

In Equation 10, a codeword is expressed as an $N_T \times 1$ vector where NT is the number of Tx antennas and the codeword is composed of an upper vector $X_i(k)$ and a lower vector $\alpha_j X_i(k)$ representing the correlation characteristics of the horizontal and vertical antenna groups, respectively. $X_i(k)$ is expressed as a vector having the linear phase increment property, reflecting the correlation characteristics between antennas in each antenna group. As a representative example, a discrete Fourier transform (DFT) matrix may be used.

An advanced system such as an LTE-A system considers achievement of an additional multi-user diversity by the use of MU-MIMO. Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in SU-MIMO should be reported in MU-MIMO.

In CoMP JT, because a plurality of eNBs transmits the same data to a specific UE through cooperation, the eNBs may be theoretically regarded as forming a MIMO system with antennas distributed geographically. That is, even when MU-MIMO is implemented in JT, highly accurate CSI is required to avoid interference between CoMP-scheduled UEs as in a single cell MU-MIMO operation. The same applies to CoMP CB. That is, to avoid interference with a serving cell caused by a neighbor cell, accurate CSI is needed. In general, a UE needs to report an additional CSI feedback in order to increase the accuracy of CSI feedback. The CSI feedback is transmitted on a PUCCH or a PUSCH to an eNB.

Hereinafter, a vehicular communication system based on the above-described wireless communication system will be described.

Figure 8:
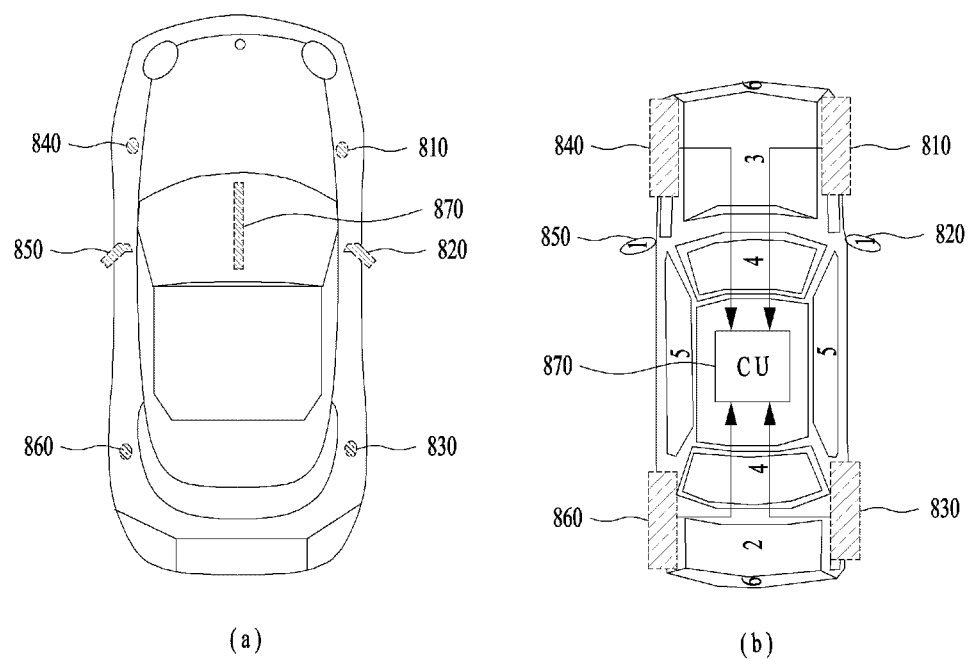
FIG. 8 is a diagram showing a vehicle including a plurality of antenna arrays according to an embodiment of the present invention.

FIG. 8 is a diagram showing a vehicle including a plurality of antenna arrays according to an embodiment of the present invention. The number of uses of the above-described wireless communication system and service categories using the wireless communication system have increased. At this time, unlike an existing static service, need to provide high data throughput, high data rate and high quality of service (QoS) to user equipments (UEs) or users moving at a high speed has increased.

For example, a wireless communication system needs to support wireless services having good quality to moving UEs when a plurality of UEs or users (hereinafter, collectively referred to as a UE) desires to view multimedia content while using public transportation or when a plurality of UEs of passengers riding in a personal vehicle traveling on an expressway uses different wireless communication services.

However, a conventional wireless communication system has some limits in provision of a service to a UE in consideration of high-speed movement or mobility. At this time, in order to support a service, a system network needs to be revolutionized. In addition, a new system for maintaining compatibility with an existing network infrastructure without influencing the existing network infrastructure needs to be designed.

At this time, for example, as described below, a large-sized antenna array may be mounted in a vehicle such that the vehicle acquires large array gain, thereby providing services having good quality to UEs located in the vehicle even in a state in which the vehicle moves at a high speed. At this time, in the vehicle, data received through a central unit (hereinafter, CU) may be relayed to the UEs located in the vehicle. At this time, a vehicular MIMO system may be considered. At this time, as described above, if a large-sized antenna array is used, the vehicle can prevent communication performance from being lowered due to penetration loss having an average value of 20 dB. In addition, since the vehicle uses receive (rx) antennas greater in number than the number of UEs using a system, large array gain can be easily obtained and reception diversity can be obtained by ensuring a distance between the receive antennas. That is, it is possible to provide a service to a UE moving at a high speed without additionally designing a network through the vehicular MIMO system.

In spite of the above-described advantages, up to now, it has been difficult to apply a vehicular MIMO system due to problems related to vehicle appearance and manufacturing system establishment. In addition, the vehicle is significantly expensive as compared to a personal portable communication device and cannot be easily improved and updated. In addition, since the vehicle should satisfy many requirements such as design concept and aeromechanical structure in addition to communication performance, the design of the vehicle may be aesthetically/aeromechanically restricted. For example, some vehicle manufacturers have used complex antennas having quality inferior to that of a single antenna in order to eliminate visual inconvenience of an existing antenna.

In order to solve spatial restriction of a large-sized antenna array in an environment in which a communication system needs to be developed, installation of a distributed antenna array system for implementing a multi-antenna-array system in a vehicle has been gradually introduced in consideration of vehicle appearance.

At this time, for example, referring to FIG. 8, a vehicle may include a plurality of antennas 810, 820, 830, 840, 850 and 860 mounted therein. At this time, the locations and number of the plurality of antennas 810, 820, 830, 840, 850 and 860 may be changed according to vehicle design. At this time, the below-described configuration is equally applicable even when the locations and number of the plurality of antennas 810, 820, 830, 840, 850 and 860 mounted in the vehicle are changed, and the present invention is not limited to the below-described embodiments. That is, the present invention is applicable to antennas having various shapes and radiation patterns according to the locations of the plurality of antennas 810, 820, 830, 840, 850 and 860.

At this time, signals for distributed antenna units (DUs) of the vehicle may be controlled through a central unit (CU) 870. That is, the CU 870 of the vehicle may control the signals for the DUs 810, 820, 830, 840, 850 and 860 mounted in the vehicle to receive a signal from a base station while maximizing reception diversity and to prevent wireless connection between the base station and the vehicle in a state in which the vehicle moves at a high speed. That is, the vehicle may be a UE having a plurality of antennas or a relay for relaying a signal. The vehicle may provide a service having good quality to a plurality of UEs located in the vehicle through control and relay of the signal received through the CU 870.

Figure 9:
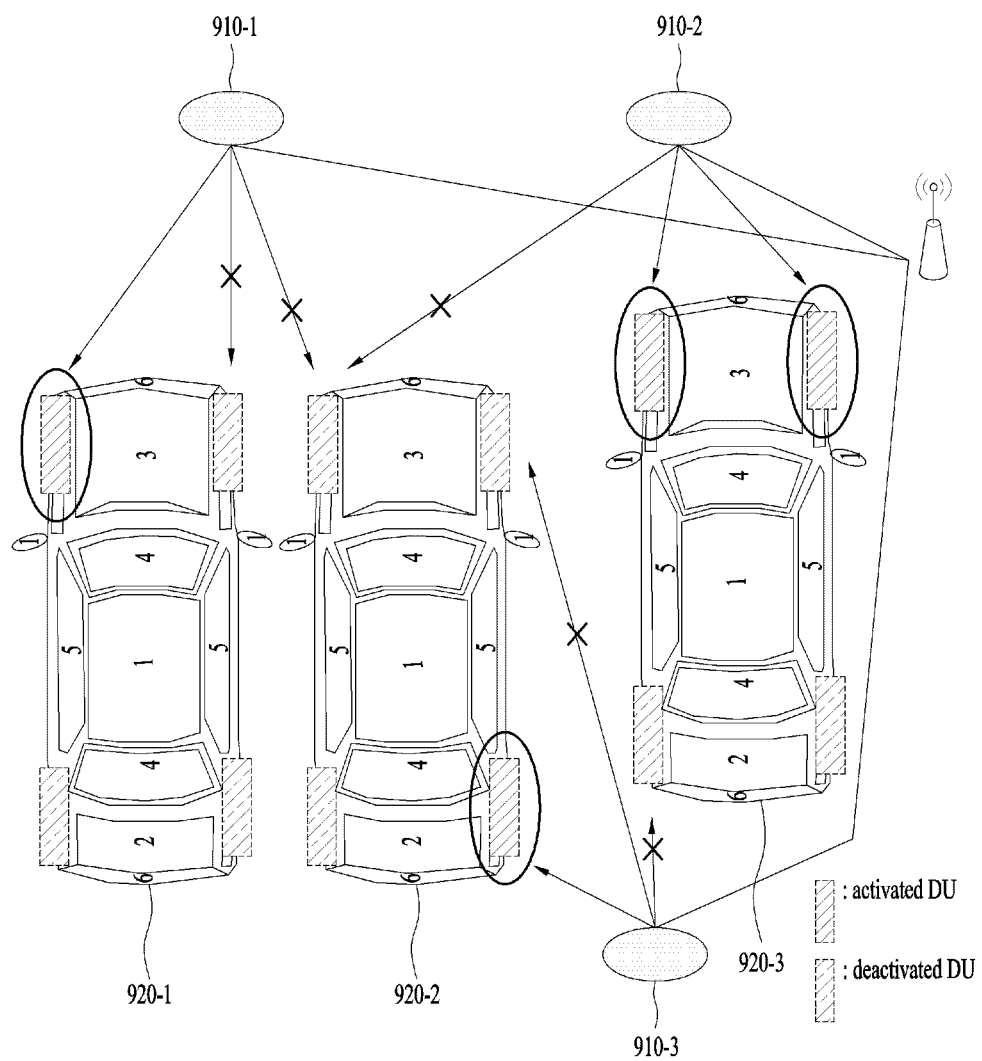
FIG. 9 is a diagram showing a method of selecting a distributed antenna unit (DU) in a state in which a plurality of vehicles is concentrated, according to an embodiment of the present invention.

FIG. 9 is a diagram showing a method of selecting a distributed antenna unit (DU) in a state in which a plurality of vehicles is concentrated, according to an embodiment of the present invention.

As described above, a vehicle may include a plurality of DUs and a CU 870 for controlling the DUs. At this time, a plurality of vehicles 920-1, 920-2 and 920-3 may be concentrated in a narrow area. For example, the plurality of vehicles 920-1, 920-2 and 920-3 may be concentrated in a narrow area upon city driving or upon a traffic jam. At this time, if the plurality of vehicles 920-1, 920-2 and 920-3 is concentrated, it may be difficult to distinguish between beams for the DUs of the vehicles due to beam sharpness. For example, if a plurality of vehicles is close to each other, the DU located at the right side of the first vehicle 920-1 may be adjacent to the DU located at the left side of the second vehicle 920-2 and thus the beams for these DUs may not be easily distinguished. That is, since DUs located adjacent to each other receive signals undergoing similar channel environments, a plurality of DUs may be likely to receive the same beam or not to receive a signal due to blocking of obstacles.

Accordingly, activation of the DUs deployed in the plurality of vehicles 920-1, 920-2 and 920-3 needs to be controlled. More specifically, the vehicles 920-1, 920-2 and 920-3 may selectively control activation or deactivation of the DUs based on the density of neighboring vehicles. For example, when a beam transmitted from a first base station 910-1 to a first vehicle 920-1 is received, the first vehicle 920-1 may activate only the DUs located at the left side of the first vehicle 920-1 and deactivate the remaining DUs of the first vehicle 920-1, to be distinguished from the adjacent second vehicle 920-2. At this time, for example, the first vehicle 920-1 may determine whether vehicles are concentrated using a position information reception unit (e.g., a GPS) or a proximity sensor. In addition, for example, whether the DUs are deactivated may be determined based on a threshold value based on density of vehicles. At this time, a threshold value may be a criterion value for determining activation or deactivation. That is, a criterion for determining whether the vehicles 920-1, 920-2 and 920-3 are concentrated may be changed and is not limited to the above-described embodiment.

In addition, the third vehicle 920-3 may activate two DUs located at the front side of the third vehicle 920-3 in order to receive the beam from the second base station 910-2. That is, the vehicles 920-1, 920-2 and 920-3 may selectively activate/deactivate the DUs thereof to distinguish the beam received through the activated DUs thereof from the beams capable of being received by adjacent vehicles. Therefore, beams passing through independent paths experiencing different clusters are received, thereby improving beam reception performance.

In addition, the vehicles may feed information on activation and deactivation of the DUs back to the base station as described above. At this time, for example, the above-described information may be fed back along with channel state information (CSI) fed back from the vehicles to the base station.

More specifically, a transmission end needs to obtain information on a channel and to accurately measure a suitable beam and gain obtained upon using the beam based on the information. At this time, in a wireless communication system, a reception end (e.g., a UE or a vehicle) may feed channel information back to the transmission end (e.g., the base station) in the form of CSI after measuring the channel.

At this time, for example, in a MIMO system, since a plurality of antennas is used, a plurality of channels may be present and CSI may be defined as a combination of sub-channels. At this time, as the number of antennas used in the MIMO system increases, a complicated format may be used. In consideration of such an environment, an implicit CSI reporting scheme or an explicit CSI reporting scheme may be used as a CSI reporting scheme. That is, an implicit CSI reporting scheme or an explicit CSI reporting scheme may be used as a CSI reporting scheme of a massive MIMO environment.

At this time, for example, the implicit CSI reporting scheme may refer to a scheme of analyzing information on a channel measured by a reception end and reporting only information substantially necessary to generate a beam, without reporting the information on the channel measured by the reception end. That is, only necessary information may be fed back based on a predefined or predetermined value.

In contrast, the explicit CSI reporting scheme may refer to a scheme of reporting information maximally approximating to a measured value to a transmission end without a process of analyzing a channel measured by a reception end. At this time, a method of quantizing a MIMO channel represented in a matrix or performing SVD operation may be used in the channel information. For example, the implicit CSI report information may include a precoding matrix index (PMI), a channel quality indicator (CQI), rank information (RI), etc.

In addition, the explicit CSI report information may include channel coefficient quantization & quantization index feedback, MIMO matrix or vector quantization & quantization index feedback, channel covariance matrix feedback, Eigen matrix feedback (transmission of Eigen vectors and/or Eigen values of channel matrix), etc. At this time, the implicit CSI reporting scheme can reduce signal overhead as compared to the explicit CSI reporting scheme, since only necessary information is extracted and fed back.

At this time, in association with the CSI feedback method of a conventional wireless communication system, a UE receives a pilot signal (reference signal) for channel estimation from a base station and calculates and reports channel state information (CSI) to the base station. At this time, the base station transmits data to the UE based on the CSI fed back from the UE. At this time, in a wireless communication system, the CSI fed back by the UE may include a channel quality indicator (CQI), a precoding matrix index (PMI), a rank indicator (RI), etc.

At this time, CQI feedback may be radio channel quality information provided to the base station for the purpose of providing information regarding which modulation and coding scheme (MCS) is applied when the base station transmits data (for link adaptation). When radio quality between the base station and the UE is high, the UE may feed back a high CQI value and the base station may apply a relatively high modulation order and a low channel coding rate and transmit data. Otherwise, the UE may feed back a low CQI value and the base station may apply a relatively low modulation order and a high channel coding rate and transmit data.

In addition, PMI feedback may be feedback of preferred precoding matrix information provided to the base station for the purpose of providing information regarding which MIMO precoding is applied when the base station includes multiple antennas mounted therein. The UE may estimate a downlink MIMO channel between the base station and the UE from a pilot signal and provide information indicating which MIMO precoding is applied to the base station through PMI feedback. In a conventional wireless communication system, only linear MIMO precoding representable in a matrix in a configuration of a PMI was considered. At this time, the base station and the UE share a codebook composed of a plurality of precoding matrices and each MIMO precoding matrix in the codebook has a unique index. Accordingly, the UE may feed back an index corresponding to a most preferred MIMO precoding matrix in the codebook as PMI, thereby minimizing the amount of feedback information of the UE.

Lastly, RI feedback may be feedback of information on the number of preferred transport layers provided to the base station for the purpose of providing information on the number of transport layers preferred by the UE when each of the base station and the UE includes multiple antennas mounted therein and thus multilayer transmission through spatial multiplexing is possible. At this time, since the base station should know which precoding is applied to each layer according to the number of transport layers, the RI may be closely related with the PMI. For example, in configuration of PMI/RI feedback, a PMI codebook may be configured based on single-layer transmission and then a PMI may be defined and fed back per layer. However, in such a method, the amount of PMI/RI feedback information is significantly increased as the number of transport layers increases. Accordingly, in a conventional wireless communication system, a PMI codebook according to the number of transport layers was defined. That is, N matrices having a size of Nt×R may be defined in the codebook, for R-layer transmission (here, R denotes the number of layers, Nt denotes the number of transmit antenna ports, and N denotes the size of a codebook). At this time, the size of the codebook may be defined regardless of the number of transport layers. As a result, when the PMI/RI is defined in such a structure, the number R of transport layers becomes equal to the rank value of the precoding matrix (Nt×R matrix) and thus may be referred to as a rank indicator (RI).

In addition, in a conventional wireless communication system, CSI may be obtained in an overall system frequency region or some frequency regions (e.g., Wideband CSI, Subband CSI). Particularly, in a system using orthogonal frequency division multiple access (OFDMA) technology, CSI of some frequency regions (e.g., subband) preferred per UE may be obtained and fed back.

At this time, the below-described PMI/RI may not be limited to the index value of a precoding matrix represented in an Nt×R matrix and the rank value of a precoding matrix like a PMI/RI of a wireless communication system. In addition, the below-described PMI indicates preferred MIMO precoder information among MIMO precoders appliidable to a transmission end and the precoder is not limited to a linear precoder represented in a matrix as in a conventional wireless system. In addition, the below-described RI has a broader meaning than the RI in the conventional wireless communication system and may include all feedback information indicating the number of preferred transport layers without being limited thereto.

In addition, for example, the PMI value may not include only one index. For example, in the conventional wireless communication system, a final PMI is divided into W1 which is a long term and/or wideband (WB) PMI and W2 which is a short term and/or subband (SB) PMI, thereby designing a PMI having a dual structure. At this time, when the final PMI is W, W=W1*W2 or W=W2*W1 may be defined. In addition, for example, in an LTE-A system, if the number of transmit antenna ports is 8 or if the number of transmit antenna ports is 4 and alternativeCodeBookEnabledFor4TX-r12=TRUE is configured through RRC signaling, a final MIMO precoding matrix may be derived by only combining two indices (WB PMI & SB PMI).

In addition, in a wireless communication system, in single user-MIMO (SU-MIMO), only data of one UE may be scheduled in the same time/frequency domain. That is, if information is transmitted to and received from one UE by MIMO, only scheduling information of one UE may be included in one time/frequency domain. In contrast, in multiuser-MIMO (MU-MIMO), data of a plurality of UEs may be scheduled together in one time/frequency domain. At this time, in MU-MIMO, the data is multiplexed in the same time/frequency domain, thereby obtaining additional gain. However, if the plurality of UEs is scheduled together, co-channel interference is generated by the UEs, thereby deteriorating system performance. At this time, the UE may feed CSI thereof back to the base station and the base station may schedule a user based on the CSI fed back from the plurality of UEs, thereby optimizing a system.

However, if a new UE is further scheduled in an SU-MIMO state or an MU-MIMO state, in a conventional wireless communication system, influence of interference between users generated by scheduling the new UE in the system may not be considered. That is, since only channel information considering SU-MIMO is fed back and the base station only checks the channel state of each user and cannot acquire information on interference to be experienced by each user in MU-MIMO, it may be difficult to reduce influence of interference between UEs. Accordingly, when SU-MIMO is switched to MU-MIMO or if MU-MIMO operates, multiplexing gain capable of being obtained by supporting multiple UEs needs to be sufficiently considered.

Hereinafter, in consideration of the aforementioned situation, the present specification proposes a method of designing a hierarchical precoder by a UE, i.e., a method of receiving some information from an eNB to design a more accurate precoder when there is a plurality of UEs (or vehicles). In this case, a precoder with a hierarchical structure may be designed in consideration of a direction and resolution of a beam received by each of the plurality of UEs and, via the design method, the plurality of UEs may transmit and receive data using a MU-MIMO method while reducing interference between UEs.

Hereinafter, an embodiment will be described in more detail based on multi-vehicular communication via vehicle-to-vehicle cooperation in a dense vehicular environment but is not limited thereto. That is, the present specification may also be applied based on the same problem in an environment in which a plurality of UEs including a plurality of antennas is densely arranged and is not limited to the above embodiment.

Figure 12:
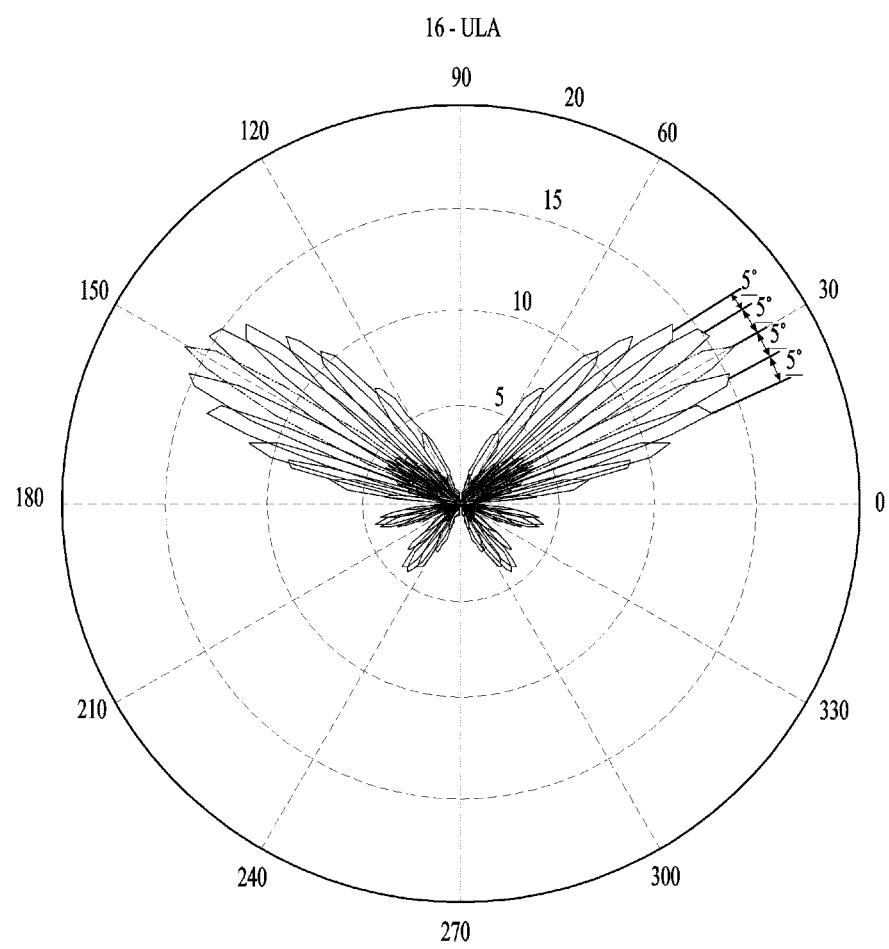
FIG. 12 is a diagram showing a beam direction and beam resolution based on beamforming according to an embodiment of the present specification.

FIGS. 10 to 12 are diagrams showing a beam direction and beam resolution based on beforming according to an embodiment of the present specification.

When a plurality of vehicles are densely arranged or a plurality of UEs are densely arranged, if data is transmitted and received through a MIMO system, there is a need for a method of designing a precoder according to a beam direction and resolution, as described above. That is, each precoder may be determined based on a beamforming scheme. In this case, for example, the beamforming scheme may be any one of digital beamforming, analog beamforming, and hybrid beamforming.

In this case, for example, the digital beamforming is a method of changing a signal phase and amplitude for forming a beam for each antenna port using a signal processing scheme in a base band edge. In this case, the digital beamforming may advantageously form independent beams for respective frequency bands and finely form a beam.

On the other hand, the analog beamforming is a method of changing a phase and size value of a signal transmitted in a base band for each antenna element to form a beam. In this case, a beam is formed in an RF end and, thus, it may be advantageous that a relatively small number of signal processing blocks is used and hardware complexity with respect to a base band may be lowered. However, in the analog beamforming scheme, variable beam formation may be applied to the time axis and the same beam formation in all bands may be applied to the frequency axis, thereby lowering a degree of beamforming freedom and lowering the accuracy of the formed beam.

In this case, the hybrid beamforming may be a method obtained by combining the aforementioned digital beamforming and analog beamforming. In this case, the hybrid beamforming may simultaneously apply the aforementioned digital beamforming and analog beamforming to control a beam direction and resolution. However, in the hybrid beamforming, when existing analog beamforming and digital beamforming are simply combined, performance of digital beamforming designed to split an existing uniform radial angle may be degraded. For example, even if the same digital codebook is used under different analog beamforming schemes, there is a problem in that final beams have different resolutions. Accordingly, when the hybrid beamforming is applied, a method of coupling the digital beamforming in consideration of the analog beamforming needs to be controlled. That is, there is a need for a new design method of a digital precoder in consideration of analog beamforming.

In detail, for the hybrid beamforming, it may be necessary to divide a digital beam coefficient into an analog beam precompensation part and a fine-tuning part and to design a precoder.

In this case, referring to FIG. 10A and Table 1 below, when digital beamforming is simply combined with analog beamforming, resolution of digital PMI may be differently set according to a boresight of an analog beam in the same analog beam region. Referring to FIG. 10B and Table 1 below, when digital beamforming is simply combined with different analog beamforming schemes, resolution of digital PMI may be differently set for the respective analog beams.

TABLE 1

| | Beam Resolution Variation | |
| --- | --- | --- |
| Applied Scheme | In the same analog beam region | Between different analog beams |
| Digital BF $P = \{P_1, P_2, P_3, P_4, \ldots\}$ | Digital PMI resolution is changed according to boresight of analog beam. | Digital PMI resolution for each analog beam is changed. |
| Joint BF design $X \circledast P$ $X = \{X_1, X_2, X_3, X_4, \ldots\}$ $P = \{P_1, P_2, P_3, P_4, \ldots\}$ X: Analog BF coefficient P: Digital BF coefficient $\circledast$ : Hadamardproduct | Digital PMI with the same resolution in analog beam is provided. | Analog beam precompensation beamforming (x) is applied Digital PMI of the same resolution in all analog beam boresights is provided. |

When hybrid beamforming is applied, if analog beamforming and digital beamforming are simply combined, an eNB may have difficulty in controlling a beam direction and resolution to direct a beam to a desired UE.

Accordingly, for the digital beamforming, it may be necessary to divide a coefficient into an analog beam precompensation part and a fine-tuning part and to design a precoder. That is, it may be necessary to separately design a digital precoder part based on consideration of analog beamforming and a precoder part for final beam resolution.

In this case, for example, a digital codebook may be designed in consideration of analog beamforming updated with a long-term. In this case, in consideration of the aforementioned environment, it may be necessary to maintain the same design rule irrespective of an analog beam angle.

In this case, in the hybrid beamforming, as a setting value of analog beamforming is accurately removed via precompensation, more accurate beamforming may be possible. Accordingly, an eNB may design an analog beam precompensation coefficient of a digital beamforming coefficient using an analog beam weight and an accurate reverse phase. In this case, the analog beam precompensation coefficient may basically change a reference point of a target beam direction to zero degrees irrespective of an analog beamforming angle.

In more detail, referring to FIGS. 11A and 11B, in the analog beamforming, a direction of a reference point may be changed to zero degrees by a precompensation part of the digital precoder. Then, for adjustment of beam resolution, a final beam setting value of the digital beamforming coefficient may set a direction of a final beam based on zero degrees irrespective of an analog beamforming setting value. Accordingly, final target setting may be re-calculated based on zero degrees.

In more detail, Equations 11 to 14 below may be considered based on the aforementioned configuration.

$$v = \begin{bmatrix} v_1 \\ v_2 \\ \vdots \\ v_{N_{RF}} \end{bmatrix} = \begin{bmatrix} 1 \\ e^{j\pi \cdot N_t^{RF} \cdot 1 \cdot (\sin(\phi) - \sin(\phi+\psi))} \\ \vdots \\ e^{j\pi \cdot N_t^{RF} \cdot (N_{RF}-1) \cdot (\sin(\phi) - \sin(\phi+\psi))} \end{bmatrix}$$ [Equation 11]

$$= \begin{bmatrix} 1 \\ e^{j\pi \cdot N_t^{RF} \cdot 1 \cdot \sin(\phi)} e^{-j\pi \cdot N_t^{RF} \cdot 1 \cdot \sin(\phi+\psi)} \\ \vdots \\ e^{j\pi \cdot N_t^{RF} \cdot (N_{RF}-1) \cdot \sin(\phi)} e^{-j\pi \cdot N_t^{RF} \cdot (N_{RF}-1) \cdot \sin(\phi+\psi)} \end{bmatrix}$$

$$= \underbrace{\begin{bmatrix} 1 \\ e^{j\pi \cdot N_t^{RF} \cdot 1 \cdot \sin(\phi)} \\ \vdots \\ e^{j\pi \cdot N_t^{RF} \cdot (N_{RF}-1) \cdot \sin(\phi)} \end{bmatrix}}_{\text{Analog beam compensation}} \oplus \underbrace{\begin{bmatrix} 1 \\ e^{-j\pi \cdot N_t^{RF} \cdot 1 \cdot \sin(\phi+\psi)} \\ \vdots \\ e^{-j\pi \cdot N_t^{RF} \cdot (N_{RF}-1) \cdot \sin(\phi+\psi)} \end{bmatrix}}_{\text{Final digital beam}}$$

$\oplus$: Hadamard product

In this case, as shown in Equation 11 above, a precoder for a digital beam may be divided into an analog beam precompensation part and a part for a final digital beam and may be designed. In this case, the analog beam precompensation part may be a first precoder and the final digital beam part may be a second precoder. That is, in the hybrid beamforming, a digital precoder may be divided into an analog precompensation part and a final digital beam part and may be designed as a hierarchical structure precoder, which will be described below. Based on precoder information that is fed back via the aforementioned design of the hierarchical structure precoder, an eNB may control a beam direction and resolution to direct a beam to a desired UE.

In this case, for example, in the case of $N_t=16$ $N_t^{RF}=4$, $N_{RF}=4$ in Equation 11 above, when all beams are rotated with $\phi=30°$ via analog beamforming and are further rotated with $\psi=5°$ via digital beamforming to set a final beam direction to 35°, Equation 12 below may be satisfied.

$$v = \begin{bmatrix} v_1 \\ v_2 \\ v_3 \\ v_4 \end{bmatrix} = \begin{bmatrix} 1 \\ e^{j\pi \cdot 4 \cdot 1 \cdot \sin(30°)} \\ e^{j\pi \cdot 4 \cdot 2 \cdot \sin(30°)} \\ e^{j\pi \cdot 4 \cdot 3 \cdot \sin(30°)} \end{bmatrix} \oplus$$ [Equation 12]

$$\begin{bmatrix} 1 \\ e^{-j\pi \cdot 4 \cdot 1 \cdot \sin(35°)} \\ e^{-j\pi \cdot 4 \cdot 2 \cdot \sin(35°)} \\ e^{-j\pi \cdot 4 \cdot 3 \cdot \sin(35°)} \end{bmatrix} = \begin{bmatrix} 1 \\ e^{j\pi \cdot 4 \cdot \sin(30°)} \\ e^{j\pi \cdot 8 \cdot \sin(30°)} \\ e^{j\pi \cdot 12 \cdot \sin(30°)} \end{bmatrix} \oplus \begin{bmatrix} 1 \\ e^{-j\pi \cdot 4 \cdot \sin(35°)} \\ e^{-j\pi \cdot 8 \cdot \sin(35°)} \\ e^{-j\pi \cdot 12 \cdot \sin(35°)} \end{bmatrix}$$

Equation 13 below may be derived from Equation 12 above and, in the case of $\phi=30°$ in Equation 13 below, when $\psi=\pm5°$ is applied to set a final beamforming rotation angle to 35°, Equation 14 below may be satisfied.

$$\sum a(\theta) = (1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times$$ [Equation 13]
$$(v_1 + \exp(j\pi 4[\sin(\theta) - \sin(\phi)]) \cdot v_2 + \exp(j\pi 8[\sin(\theta) - \sin(\phi)]) \cdot v_3 + \exp(j\pi 12[\sin(\theta) - \sin(\phi)]) \cdot v_4)$$

$$= (1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times$$
$$\begin{pmatrix} 1 + \exp(j\pi 4[\sin(\theta) - \sin(\phi) + \sin(\phi) - \\ \sin(\phi + \psi)]) + \exp(j\pi 8[\sin(\theta) - \\ \sin(\phi) + \sin(\phi) - \sin(\phi + \psi)]) + \\ \exp(j\pi 12[\sin(\theta) - \\ \sin(\phi) + \sin(\phi) - \sin(\phi + \psi)]) \end{pmatrix}$$

$$= (1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times$$
$$(1 + \exp(j\pi 4[\sin(\theta) - \sin\phi + (\psi)]) + \exp(j\pi 8[\sin(\theta) - \sin(\phi + \psi)]) + \exp(j\pi 12[\sin(\theta) - \sin(\phi + \psi)]))$$

$$\sum a(\theta) = (1 + \exp(j\pi\lfloor\sin(\theta) - \sin(30°)\rfloor) + \exp(j\pi 2\lfloor\sin(\theta) - \sin(30°)\rfloor) + \exp(j\pi 3\lfloor\sin(\theta) - \sin(30°)\rfloor)) \times (1 + \exp(j\pi 4[\sin(\theta) - \sin(35°)]) + \exp(j\pi 8[\sin(\theta) - \sin(35°)]) + \exp(j\pi 12[\sin(\theta) - \sin(35°)]))$$ [Equation 14]

For example, a precoder of a digital beam may be represented according to a final antenna array vector shown in FIG. 12 by performing digital beamforming on $\psi=\pm5°$, $\psi=\pm10°$, and $\psi=\pm15°$ as a fine beam. That is, beams with beam resolution based on a unit of 5° may be separately set. Thereby, an eNB may control a beam direction and resolution in consideration of a position, etc. of a UE as a beam transmission target.

Figure 13:
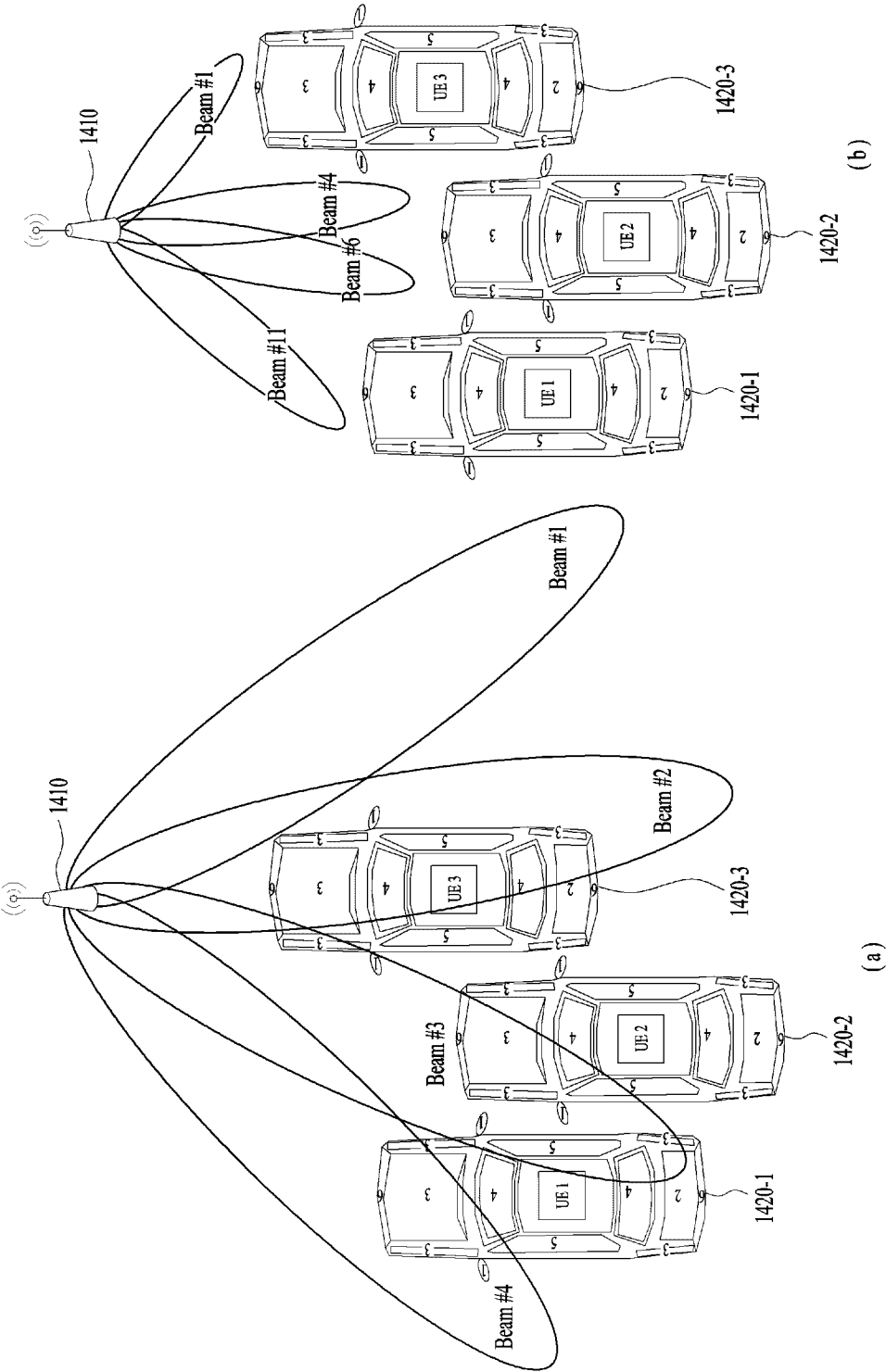
FIG. 13 is a diagram showing a method of transmitting a beam based on beam sharpness by an eNB according to an embodiment of the present specification.

FIG. 13 is a diagram showing a method of transmitting a beam based on beam sharpness by an eNB according to an embodiment of the present specification. For an environment in which a plurality of MIMO vehicles is densely arranged or a plurality of MIMO UEs is densely arranged, a beam may be limited based on beam sharpness.

In more detail, referring to FIG. 13A, in a wireless communication system, a direction and resolution of a beam transmitted from the eNB may be determined based on an existing codebook. In this case, when a plurality of vehicles is densely arranged and beam resolution is low, it may be difficult to divide and distinguish a beam. For example, in FIG. 13A, a direction of Beam #3 transmitted from an eNB 1410 is toward a first vehicle 1420-1 and a second vehicle 1420-2 and, thus, it may be difficult to determine which vehicle receives Beam #3. Accordingly, to overcome the above problem, beam resolution needs to be increased to further sharpen a beam and to distinguish a beam, as shown in FIG. 13B.

In this case, for example, a method of increasing a codebook size to generate a more precise beam may be considered as a simplest method. However, as described above, when a UE determines a precoder based on channel information measured by the UE and feeds back the determined precoder in the form of PMI, if a codebook size is increased, the amount of data that needs to be fed back by the UE may be increased and, thus, feedback overhead may be increased. In this case, in a conventional wireless communication system, a size of a feedback payload with which a UE reports CSI information may be limited and, thus, it may be difficult to adjust a precise precoder using an existing codebook structure.

Accordingly, hereinafter, the present specification proposes a method of designing a hierarchical structure precoder and feeding back the precoder by a UE to increase beam resolution while reducing a feedback payload and to clearly distinguish the beam, differently from the prior art in which a UE alone determines a precoder and reports the precoder in the form of PMI. In this case, as described above, the following methods may be applied when it is difficult to distinguish a beam via vehicle-to-vehicle communication due to densely arranged vehicles but the present specification is not limited thereto. That is, the methods may also be applied when it is difficult to distinguish a beam due to a plurality of densely arranged UEs, as described above.

Figure 14:
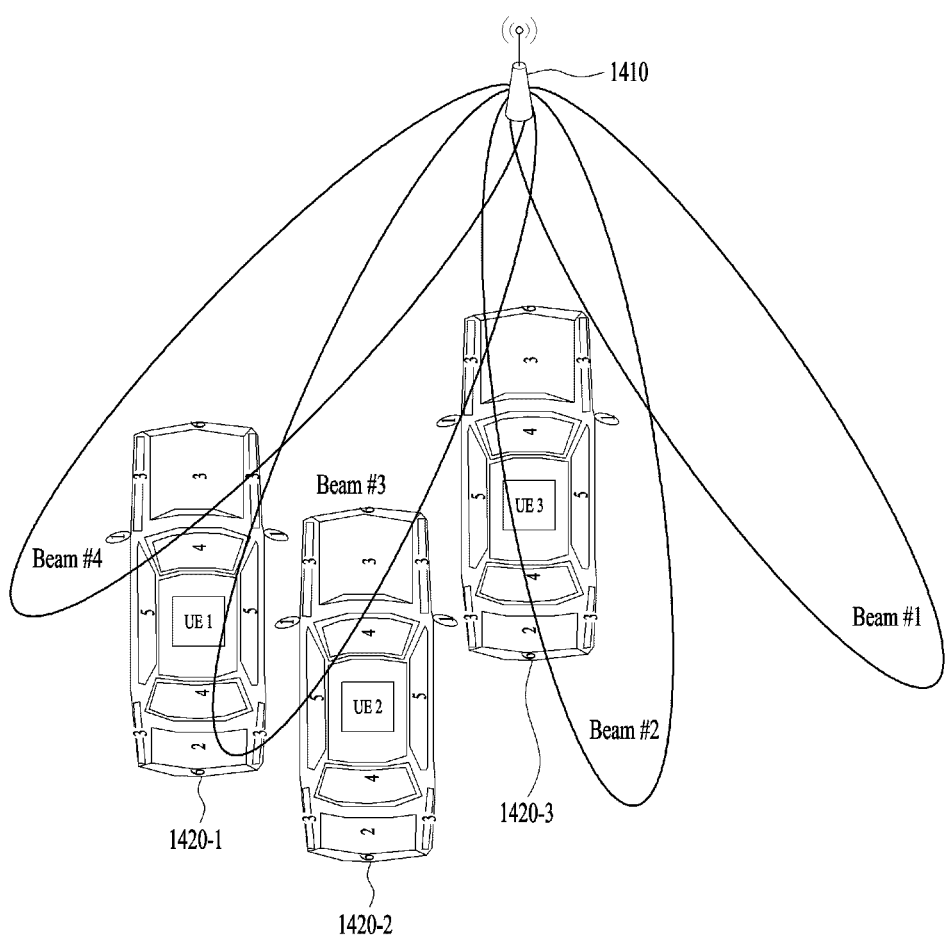
FIG. 14 is a diagram showing a method of setting a UE group of each beam according to an embodiment of the present specification.
Figure 15:
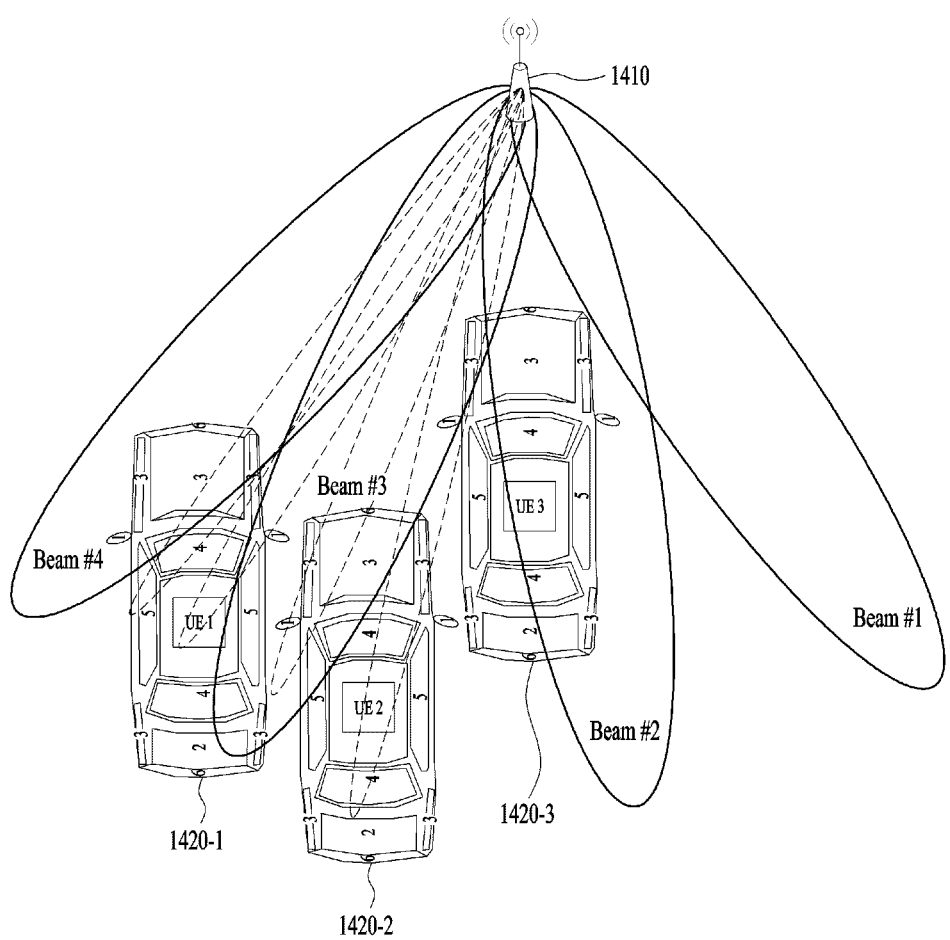
FIG. 15 is a diagramming a method of designing a hierarchical structure precoder according to an embodiment of the present specification.

FIGS. 14 and 15 are diagrams showing a method of designing a hierarchical structure precoder according to an embodiment of the present specification. A plurality of vehicles 1420-1, 1420-2, and 1430-3 may feedback channel information to an eNB 1410 based on a precoder.

In this case, for example, the eNB 1410 may group the vehicles 1420-1, 1420-2, and 1430-3 based on a first type beam direction. In this case, referring to FIG. 14, a first type beam may be a broad beam. That is, the eNB 1410 may group vehicles (or UEs, hereinafter, only vehicles will be used) belonging to similar broad beam directions for directions of broad beams. In this case, for example, the eNB 1410 may feedback grouping information to vehicles based on each broad beam using various methods, which will be described below.

For example, a group corresponding to one beam may include one or more UEs. For example, one UE may correspond to a plurality of beams. In more detail, the eNB 1410 may set a third vehicle 1420-3 for Beam #2 to one group. The eNB 1410 may set a first vehicle 1420-1, a second vehicle 1420-2, and the third vehicle 1420-3 for Beam #3 to one group. That is, the eNB 1410 may set a group including one or more vehicles for each broad beam. For example, the third vehicle 1420-3 may be a vehicle included in each of respective groups for Beam #2 and Beam #3. That is, one vehicle may also be included in a plurality of beam groups.

Then, the eNB 1410 may determine a precoder for each broad beam. In this case, the precoder determined by the eNB 1410 may be a first precoder. In this case, for example, the broad beam may be any one of an analog beam, a digital beam, or a hybrid beam. For example, in terms of a configuration of a precoder, the first precoder may be configured as a digital precoder or an analog precoder.

For example, when a hybrid beamforming structure is applied, a broad beam may be an analog beam. That is, the broad beam may be determined via analog precoding. In this case, when the hybrid beamforming structure is applied, an eNB may set the precoder for a broad beam as a precoder for setting a boresight of the broad beam to 0. That is, as described above, when the hybrid beamforming structure is applied, a precompensation part for an along beam of a hierarchical structure precoder designed with an along beam precompensation part and a fine-tuning part may be the first precoder as the aforementioned precoder for a broad beam. That is, the precoder of the broad beam determined by the eNB 1410 may be the same as the analog precompensation part of Equation 11 above. In this case, in the Joint BF design scheme shown in Table 1, X indicating analog beam precompensation beamforming may be a precoder for a broad beam.

Then, the eNB 1410 may notify each of the vehicles 1420-1, 1420-2, and 1430-3 about group information based on each beam. For example, the eNB 1410 may feedback group information only to a representative vehicle among vehicles included in a group that is set based on each beam. In this case, for example, the representative vehicle may feedback group information to other vehicles 1420-1, 1420-2, and 1430-3 in the same group via vehicle-to-vehicle communication. Thereby, in terms of a system, overhead may be reduced. For example, the eNB 1410 may broadcast or multicast group information to UEs belonging to similar broad beam directions. As another example, the eNB 1410 may signal group information to specific vehicles as a target among vehicles belonging to similar broad beam directions, and the remaining vehicles may acquire a broad beam using an overhearing method. That is, a method of feeding back group information to the plurality of vehicles 1420-1, 1420-2, and 1430-3 by the eNB 1410 may be differently set in consideration of signaling overhead in an environment in which the plurality of vehicles 1420-1, 1420-2, and 1430-3 are densely arranged, which may not be limited to the aforementioned embodiment.

Each of the vehicles 1420-1, 1420-2, and 1430-3 may feedback preference information on a broad beam to the eNB 1410 based on the received group information. In this case, for example, each of the vehicles 1420-1, 1420-2, and 1430-3 may feedback a plurality of preference information items to the eNB 1410. For example, the third vehicle 1420-3 may feedback information on one preferred beam among Beam #2 and Beam #3 to the eNB 1410 based on group information on Beam #2 and Beam #3. As another example, the third vehicle 1420-3 may feedback information indicating that both Beam #2 and Beam #3 are preferred to the eNB 1410 based on group information on Beam #2 and Beam #3. That is, the number of information items on a beam preferred by each of the vehicles 1420-1, 1420-2, and 1430-3 may be one or more and may not be limited to the aforementioned embodiment.

As another example, only some of vehicles (or vehicles included in a group) may feedback information on a preferred broad beam to the eNB 1410. In this case, for example, a vehicle that performs feedback may be autonomously determined via vehicle-to-vehicle cooperation, a vehicle determined by an eNB, or a specific type vehicle and may not be limited to the aforementioned embodiment. In this case, for example, only the first vehicle 1420-1 among the first vehicle 1420-1 and the second vehicle 1420-2 may feedback information on a preferred broad beam to the eNB 1410. In this case, for example, the first vehicle 1420-1 may transmit information indicating that both the first vehicle 1420-1 and the second vehicle 1420-2 prefer Beam #3 to the eNB 1410.

For example, the first vehicle 1420-1 may feedback information indicating that the first vehicle 1420-1 prefers Beam #4 and the second vehicle 1420-2 prefers Beam #3 to the eNB 1410. That is, some of a plurality of vehicles may transmit preferred broad beam information on the plurality of vehicles to the eNB 1410, which may not be limited to the aforementioned embodiment.

Then, the eNB 1410 may determine a beam direction of each of the vehicles 1420-1, 1420-2, and 1430-3 based on preference information and may feedback information on the determined broad beam to the UE. In this case, for example, the eNB 1410 may determine a direction of a broad beam using at least one of the fed back preference beam information of each of the vehicles 1420-1, 1420-2, and 1430-3, channel reciprocity based on a transmission signal of a UE, or position estimation information (e.g., GPS based). In this case, for example, a beam direction may be determined based on an arbitrary combination of the aforementioned information items, which may not be limited to the aforementioned embodiment. In addition, information on a broad beam may include information on the first precoder. In this case, the first precoder may be a precoder that is set in consideration of a direction of the broad beam.

Then, the eNB may feedback the information on the determined broad beam to each of the vehicles 1420-1, 1420-2, and 1430-3.

In this case, for example, the broad beam information that is fed back by the eNB may be fed back only to some UEs among UEs with high possibility that the broad beam is shared. For example, the eNB 1410 may feedback information on a broad beam only to a representative vehicle among vehicles included in a group that is set based on each beam. In this case, for example, the representative vehicle may be set via information exchange between vehicles included in the same group, which may not be limited to the aforementioned embodiment. Then, the vehicle that receives information on a broad beam from the eNB 1410 may provide the information on the broad beam to another vehicle via vehicle-to-vehicle communication (or UE-to-UE communication). Thereby, in terms of a system, overhead may be reduced. For example, the eNB 1410 may broadcast or multicast the information on the broad beam to UEs belonging to similar broad beam directions. As another example, the eNB 1410 may signal the broad beam information to specific vehicles as a target among vehicles belonging to similar broad beam directions, and the remaining vehicles may acquire a broad beam using an overhearing method. As another example, the eNB 1410 may notify only specific vehicles of vehicles belonging to similar broad beam directions about broad beam information via signaling, and vehicles that receive beam direction information may transmit corresponding information to the remaining vehicles via vehicle-to-vehicle communication. For example, when a specific vehicle feeds back broad beam information preferred by a specific vehicle to an eNB, surrounding vehicles or other vehicles belonging to a group may acquire corresponding information via overhearing. That is, a method of feeding back information on a broad beam by the eNB 1410 may be differently set in consideration of signaling overhead in an environment in which a plurality of vehicles is densely arranged, which may not be limited to the aforementioned embodiment.

Then, each of the vehicles 1420-1, 1420-2, and 1430-3 may design a precoder for denser beam resolution based on the determined broad beam information. That is, each of the vehicles 1420-1, 1420-2, and 1430-3 may receive the first precoder as precoder information based on a broad beam direction determined by an eNB and may design the second precoder that represents dense beam resolution based on the first precoder. That is, a vehicle may design a precoder in consideration of a beam direction, which represents dense resolution based on fine tuning as a second type beam in a broad beam direction. Thereby, each vehicle may design a hierarchical structure precoder.

In more detail, referring to FIG. 15, the second vehicle 1420-2 may receive information on Beam #2 from the eNB 1410. In this case, the information on Beam #2 may include the first precoder as information on a direction of a broad beam. That is, the information on Beam #2 may include information on a direction in which Beam #2 is directed in consideration of resolution of Beam #2.

In this case, for example, the first precoder may be a precoder for analog beam precompensation based on a hybrid beamforming structure, as described above. Then, the second vehicle 1420-2 may design the second precoder that represents denser beam resolution and a beam direction, as a second type beam in a direction of Beam #2. In this case, the second precoder may be a precoder based on a direction of any one of fine beams represented by dotted lines. That is, the second precoder may be beam information indicating a specific direction with denser beam resolution in a direction of Beam #2. In this case, for example, the second precoder may be a precoder for beam resolution via fine tuning in a hybrid beamforming structure. That is, the second vehicle 1420-2 may receive information on the first precoder of a broad beam and may design the second precoder of a fine beam based on the received first precoder to set a final beam direction and resolution. Thereby, the second vehicle 1420-2 may select a precoder obtained by considering interference between multiple vehicles in consideration of influence of an interference signal between vehicles For example, a fine beam direction based on fine tuning may be represented as a digital precoder, an analog precoder, or a hybrid precoder.

In this case, for example, the eNB 1410 may feedback information indicating which precoder is the first precoder and the second precoder among the aforementioned precoder. An eNB may acquire a final precoder with high beam resolution via various combinations and calculation according to information indicating a codebook of a hierarchical structure on which the eNB is based.

For example, when a hybrid beamforming structure is applied, the first precoder may be a precoder for analog precompensation and the second precoder may be a precoder for beam resolution based on fine tuning, as described above.

In addition, each of the vehicles 1420-1, 1420-2, and 1430-3 may feedback channel state information to the eNB 1410 based on the designed precoder and an eNB may transmit data to each of the vehicles 1420-1, 1420-2, and 1430-3 through a beam based on the channel state information.

Although the above configuration has been described in terms of vehicle-to-vehicle communication, the present specification is not limited thereto and, thus, when a plurality of UEs are densely distributed, the same method may also be applied, as described above.

Figure 16:
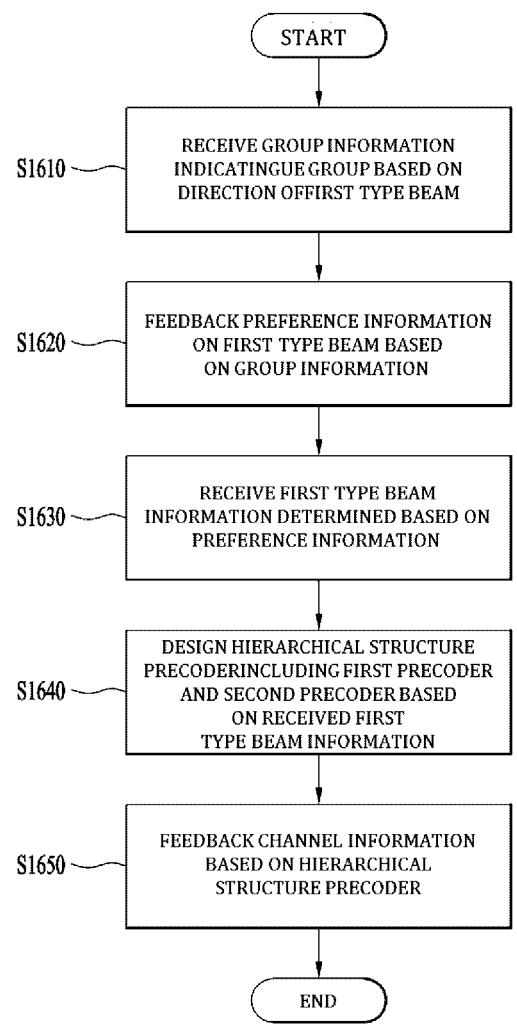
FIG. 16 is a flowchart of a method of designing a hierarchical structure precoder according to an embodiment of the present specification.

FIG. 16 is a flowchart of a method of designing a hierarchical structure precoder according to an embodiment of the present specification. A UE (or vehicle) may receive group information indicating a UE group based on a first type beam direction (S1610). In this case, as described above with reference to FIGS. 8 to 15, the first type beam may be a broad beam. In this case, the group information received by a UE may be information on a group included in the UE, and it may be possible to receive a plurality of group information items and/or a plurality of beam information items, as described above.

Then, the UE may feedback preference on a first type beam based on the group information (S1620). In this case, as described above with reference to FIGS. 8 to 15, the UE may transmit feedback information to the eNB through a representative UE. For example, the UE may transmit preference information on a plurality of beams to the eNB. Then, the UE may receive the first type beam information determined based on the preference information (S1630). In this case, as described above with reference to FIGS. 8 to 15, the first type beam information may include the first precoder. In this case, the first precoder may be a precoder that is set based on a direction of the first type beam. For example, when a hybrid beamforming structure is applied, the first precoder may be a precoder for changing a boresight of a broad beam to zero degrees via analog beam precompensation.

Then, the UE may design a hierarchical structure precoder including the first precoder and the second precoder based on the received first type beam information (S1640). Then, the UE may feedback channel information to an eNB based on the hierarchical structure precoder (S1650). In this case, as described above with reference to FIGS. 8 to 15, the second precoder may be a precoder of a direction of a second type beam in the first type beam direction. In this case, for example, the second type beam may be a beam that is set based on denser beam resolution as a fine beam. That is, the second precoder may be a beam precoder that represents denser resolution in a broad beam direction. In this case, for example, when a hybrid beamforming structure is applied, the second precoder may be a precoder representing a final beam direction in a state in which a boresight is changed to zero degrees by the first precoder.

That is, the UE may receive the first precoder as a precoder of a broad beam direction to an eNB and may design the second precoder representing a final beam direction with denser resolution based on the received first precoder. Thereby, the UE may finally design the hierarchical structure precoder. In this case, the UE may feedback channel information using the designed hierarchical structure precoder, as described above.

In this case, through the aforementioned configuration, in a wireless communication system, data may be transmitted while reducing interference without increase in a codebook size in an environment in which a plurality of vehicles or UEs is present.

Figure 17:
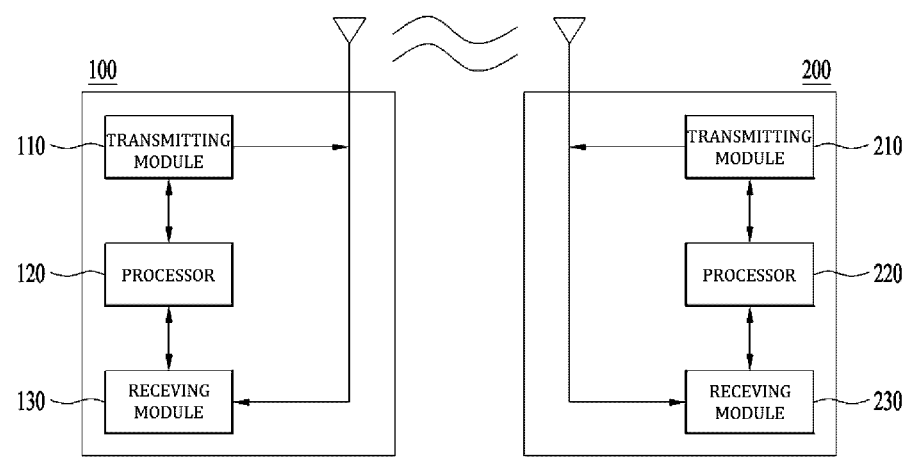
FIG. 17 is a block diagram of a UE and an eNB according to an embodiment of the present specification.

FIG. 17 is a block diagram of a UE and an eNB according to an embodiment of the present specification.

In this case, the eNB 100 may include a transmission module 110 for transmitting a radio signal, a reception module 130 for receiving a radio signal, and a processor 120 for controlling the transmission module 110 and the reception module 130. In this case, the eNB 100 may communicate with an external device using the transmission module 110 and the reception module 130. In this case, the external device may be a UE. That is, the eNB 100 may be a device that is capable of communicating with an external device, that is, a UE 200 and may not be limited to the aforementioned embodiment.

The UE 200 may include a transmission module 210 for transmitting a radio signal, a reception module 230 for receiving a radio signal, and a processor 220 for controlling the transmission module 210 and the reception module 230. In this case, the UE 200 may communicate with an eNB using the transmission module 210 and the reception module 230. That is, the UE 200 may communicate with an eNB in a wireless communication system and may not be limited to the aforementioned embodiment.

In this case, for example, the processor 220 of the UE 200 may receive group information indicating a UE group based on a direction of a first type beam using the reception module 230 and may feedback preference information on the first type beam based on the group information using the transmission module 210. The processor 220 of the UE 200 may receive first type beam information determined based on the preference information using the reception module 230 and may design a hierarchical structure precoder including a first precoder and a second precoder based on the received first type beam information to feedback channel information based on the hierarchical structure precoder using the transmission module 210. In this case, for example, the first precoder may be precoder information on the first type beam direction and the second precoder may be precoder information on a second type beam direction in the first type beam direction. In this case, for example, the first type beam may be a broad beam and the second type beam may be a fine beam in the broad beam. That is, the first precoder may be a precoder designed based on the first type beam direction and the second precoder may be a precoder of a final beam that represents denser beam resolution in the broad beam. In this case, for example, the processor 220 of the UE 200 may receive information on the first precoder through the reception module 230 from the eNB 100 and may design the second precoder based on the first precoder.

That is, the UE may deign a hierarchical structure precoder including the first precoder and the second precoder and, thereby, beam sharpness may be increased to reduce interference between multiple users without increase in codebook size.

상 The embodiments according to the present invention can be implemented by various means, for example, hardware, firmware, software, or combinations thereof.

In the case of a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of a firmware or software configuration, the method according to the embodiments of the present invention may be implemented by a module, a procedure, or a function, which performs functions or operations described above. For example, software code may be stored in a memory unit and then may be executed by a processor. The memory unit may be located inside or outside the processor to transmit and receive data to and from the processor through various well-known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein. Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both of the apparatus and method inventions may be complementarily applicable to each other.

INDUSTRIAL APPLICABILITY

Although an example of applying a method of transmitting and receiving a signal in a vehicular communication system and an apparatus therefor to a 3GPP LTE system is described, the present invention is applicable to various wireless communication systems in addition to the 3GPP LTE system.

The invention claimed is:

1. A method of designing a hierarchical structure precoder by a user equipment (UE), the method comprising:
   receiving group information indicating a UE group based on a direction of a first type beam;
   feeding back preference information on the first type beam based on the group information;
   receiving information on the first type beam, determined based on the preference information;
   designing the hierarchical structure precoder comprising a first precoder and a second precoder based on the received first type beam information; and
   feeding back channel information based on the hierarchical structure precoder,
   wherein the first precoder is precoder information on the first type beam direction and the second precoder is precoder information on a direction of a second type beam in the direction of the first type beam.

2. The method according to claim 1, wherein the first type beam is a broad beam and the second type beam is a fine beam.

3. The method according to claim 1, wherein the first precoder is information included in the received information on the first type beam.

4. The method according to claim 3, wherein the second precoder is precoder information designed based on the first precoder.

5. The method according to claim 3, wherein the second precoder is precoder information designed based on beam resolution of the second type beam.

6. The method according to claim 1, wherein the designed hierarchical structure precoder is a precoder designed based on any one of analog beamforming, digital beamforming, and hybrid beamforming.

7. The method according to claim 6, wherein, when the designed hierarchical structure precoder is a precoder designed based on the hybrid beamforming, the first type beam is determined based on the analog beamforming and the second beam is determined based on the digital beamforming.

8. The method according to claim 7, wherein the first precoder is a precoder designed based on a first compensation value of the analog beamforming and the second precoder is a precoder designed based on a second compensation value of the digital beamforming.

9. The method according to claim 8, wherein the first precoder is a precoder for changing a boresight of the analog beamforming to zero degrees; and
wherein the second precoder is a precoder for determining a direction of the hybrid beamforming based on the boresight of the analog beamforming, changed to zero degrees.

10. The method according to claim 1, wherein the first type beam information is determined further using at least one of channel reciprocity based on a transmission signal of the UE or positional information of the UE.

11. The method according to claim 1, wherein the preference information is fed back only when the UE is a representative UE in the UE group indicated by the group information.

12. The method according to claim 11, wherein the information on the first type beam is received only when the UE is the representative UE in the UE group.

13. The method according to claim 12, further comprising transmitting the information of the first UE to another UE in the UE group.

14. The method according to claim 1, wherein the preference information fed back by the UE comprises a plurality of preference information items on the plurality of first type beams.

15. A user equipment (UE) for designing a hierarchical structure precoder, comprising:
   a reception module configured to receive information from an external device;
   a transmission module configured to transmit information to an external device; and
   a processor configured to control the reception module and the transmission module,
   wherein the processor receives group information indicating a UE group based on a direction of a first type beam using the reception module, feeds back preference information on the first type beam based on the group information using the transmission module, receives information on the first type beam, determined based on the preference information, using the reception module, designs the hierarchical structure precoder comprising a first precoder and a second precoder based on the received first type beam information, and feeds back channel information based on the hierarchical structure precoder using the transmission module; and
   wherein the first precoder is precoder information on the first type beam direction and the second precoder is precoder information on a direction of a second type beam in the direction of the first type beam.

* * * * *